June 20, 1950          B. HELLER          2,512,427
DECELERATION CONTROLLED BRAKE SYSTEM FOR VEHICLES
Filed Aug. 8, 1947          3 Sheets-Sheet 1
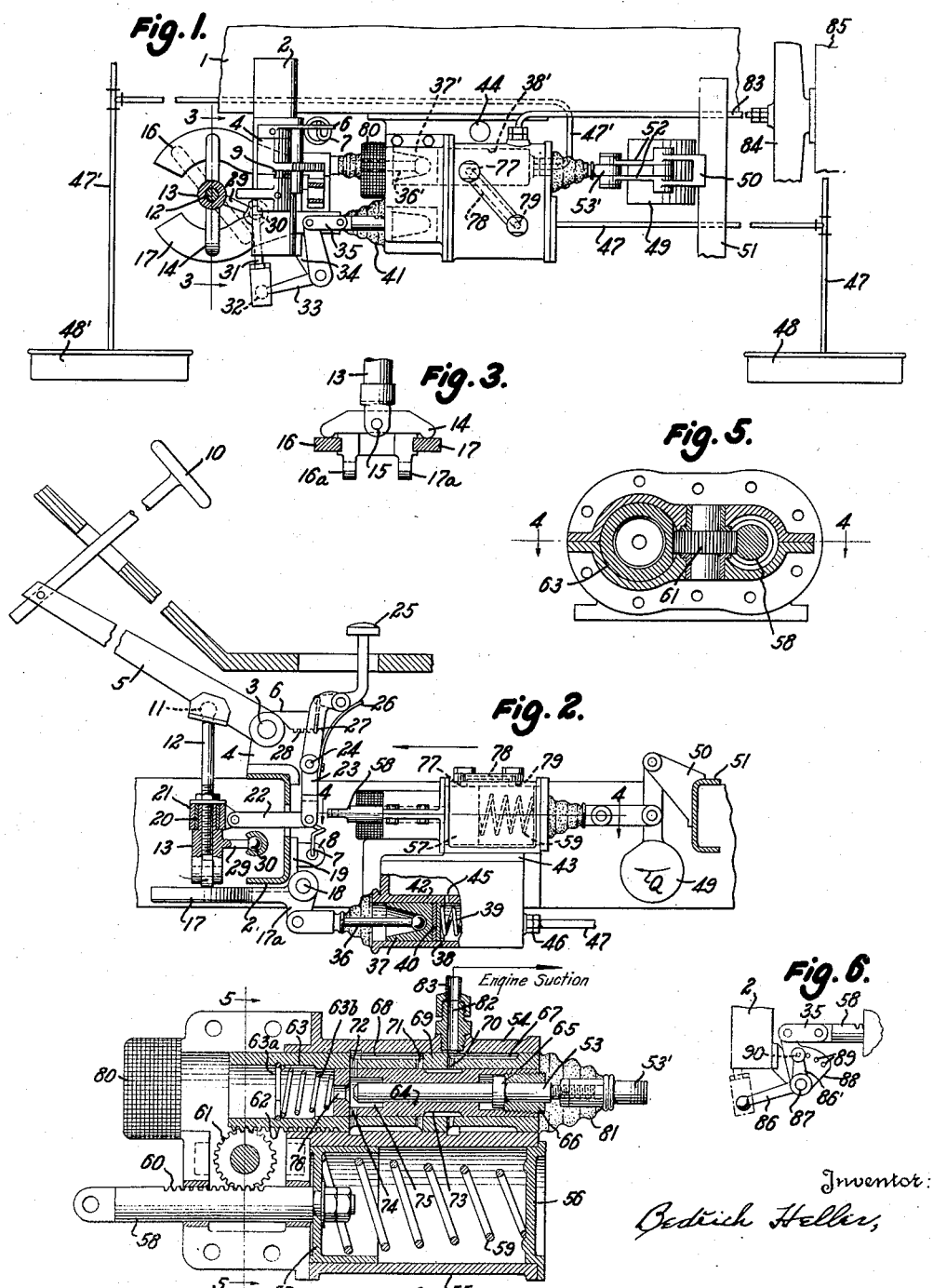
Inventor:
Bedrich Heller,
Pierce, Scheffler & Parker
Attorneys.

June 20, 1950          B. HELLER          2,512,427
DECELERATION CONTROLLED BRAKE SYSTEM FOR VEHICLES
Filed Aug. 8, 1947          3 Sheets-Sheet 2
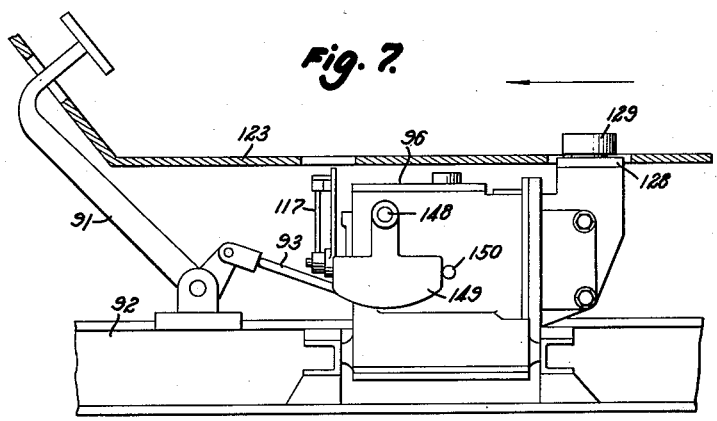
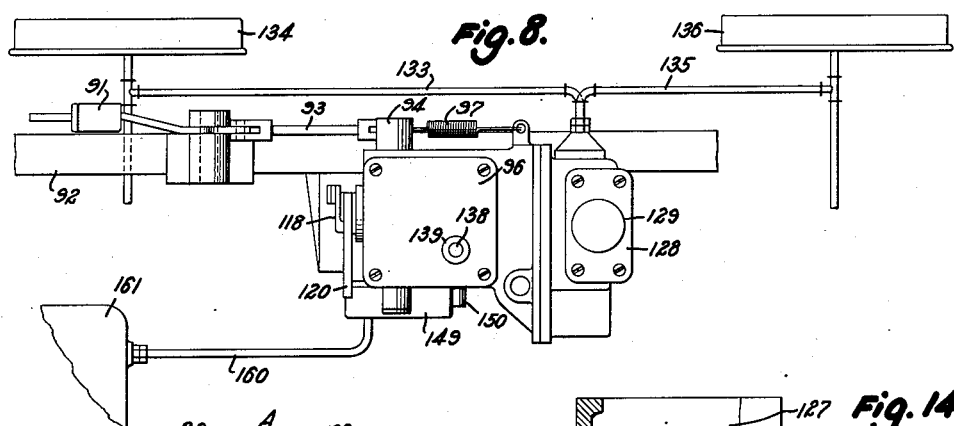
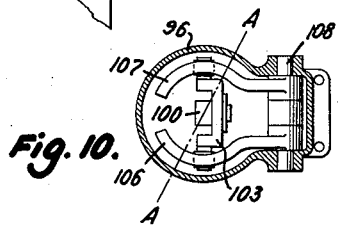
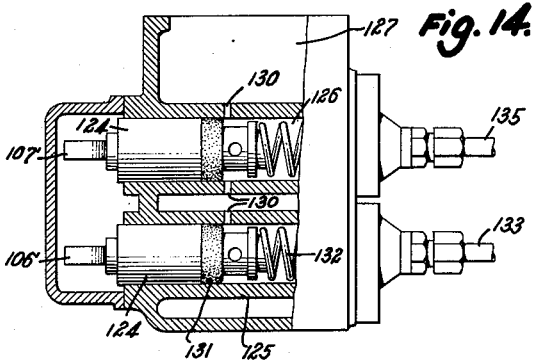
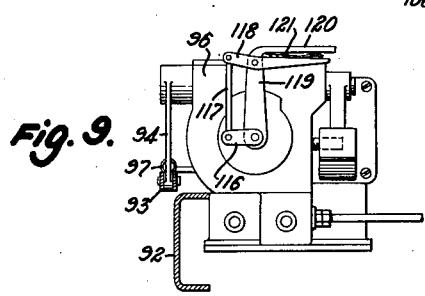

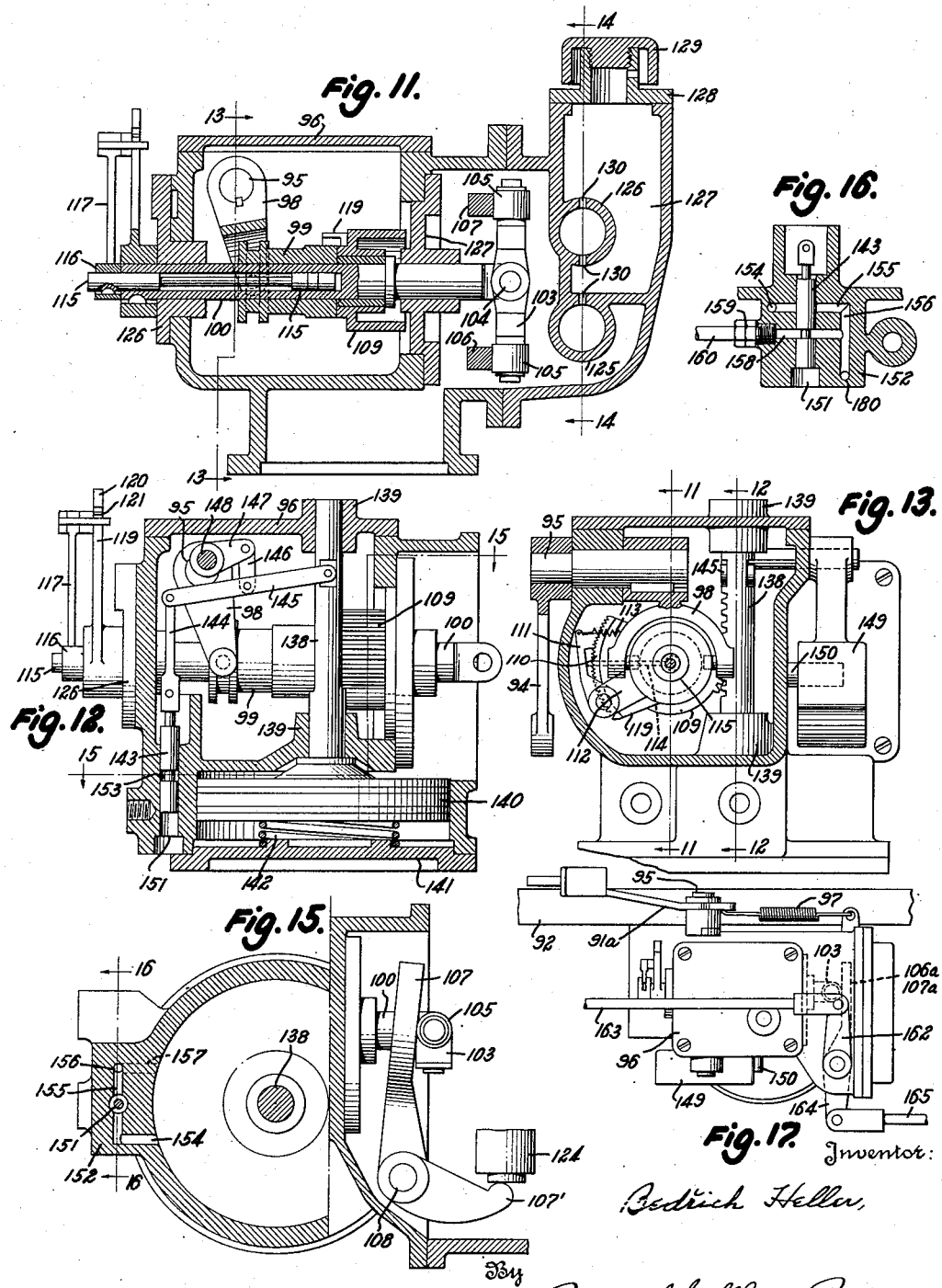

Patented June 20, 1950

2,512,427

UNITED STATES PATENT OFFICE 2,512,427

DECELERATION CONTROLLED BRAKE SYSTEM FOR VEHICLES

Bedřich Heller, Prague, Czechoslovakia

Application August 8, 1947, Serial No. 767,516
In Czechoslovakia March 13, 1946

13 Claims. (Cl. 188—152)

This invention relates to brake systems for vehicles having a plurality of sets of independently operated brakes, for example to motor vehicles having front wheel and rear wheel brakes, and more particularly to brake systems including inertia operated mechanism for varying the ratio of the braking forces imposed upon the front wheel and the rear wheel brakes according to the deceleration of the vehicle.

The wheels of a vehicle will become locked, and thus skidding may result, when the braking force (computed as effective at the circumference of the tire) is greater than the friction between a wheel tire and the road surface. The friction depends upon the loading of the wheels, and this loading changes during travel of the vehicle, especially during brake application in the case of a vehicle with two axles. The load on the front wheels increases during braking, and the load on the rear wheels decreases correspondingly, whereby the friction between the rear wheels and the road is decreased, and only a part of the available braking power can be employed with the conventional braking systems having a fixed ratio of power transmission to the front wheel brakes and to the rear wheel brakes.

It has been proposed to obtain a better braking effect by imposing an auxiliary braking force upon the rear wheels, this auxiliary braking force being controlled by an inertia mass or pendulum movably supported on the vehicle. The proposed arrangement varied the ratio of the effective braking forces applied to the front wheels and rear wheels respectively, but in an arbitrary manner which did not prevent a locking of the rear wheels on rapid deceleration produced by forceful braking or, alternatively, which avoid such wheel locking by limiting the auxiliary braking force to a low value which prevented full use of the available braking power. The auxiliary force was of a substantially fixed magnitude, being provided by a booster motor upon a preselected displacement of the inertia mass, and the total braking forces applied to the rear wheels did not vary with the loading of the rear wheels. Furthermore, the auxiliary brake force was brought into operation by the inertia mass, without actuation of the brake lever, when the vehicle travelled down hill, so that the vehicle was unintentionally braked when the road grade resulted in the preselected displacement of the inertia mass.

The loading of the rear wheels does decrease when traveling down a slope, and some of the prior proposals for varying the ratio of the braking forces at the front and rear wheels did not take this change of loading into account, thereby setting up conditions tending towards skidding on a quick application of the brakes.

Objects of the present invention are to provide a braking system in which the available braking power may be employed to the maximum in accordance with changing distribution of the loading of the front and rear wheels respectively, such changes in load distribution arising from deceleration during braking, from travel on a sloping road and/or from changes in the location and amount of the load carried by the vehicle. An object is to provide a brake system for a vehicle having a plurality of sets of independently operable brakes upon which braking forces are imposed through actuation of a common brake lever, and in which the ratio of the braking forces at the sets of brakes is automatically varied by an inertia mass in accordance with the relative loadings of the vehicle wheels with which the sets of brakes are associated. More specifically, an object is to provide a brake system of the character stated in which the brake lever effects longitudinal displacement of a rod on which a force distributing member is mounted for rocking movement, the member bears upon levers through which the braking forces are transmitted to the several sets of brakes, and an inertia mass or pendulum turns the brake rod about its axis to vary the effective lengths of the levers in opposite sense according to slope of the roadbed and the deceleration of the vehicle during braking. Other objects are to provide brake systems of the character stated which include members adjustable manually to vary the initial ratio of the braking forces applied to sets of independently operable brakes and/or to vary the ratio of power transmission in the same sense to the several sets of brakes according to the nature or condition of the road travelled by the vehicle.

These and other objects, and the advantages, of the invention will be apparent from the following specification when taken with the accompanying drawings in which:

Fig. 1 is a fragmentary plan view of a brake system embodying the invention as applied to a motor vehicle having a frame bar extending along the longitudinal axis thereof;

Fig. 2 is a fragmentary side elevation of the same, with some parts shown in vertical section;

Fig. 3 is a fragmentary vertical section taken on the plane indicated by section line 3—3 of Fig. 1;

Fig. 4 is a fragmentary horizontal section through the booster motor controlled by the inertia mass, as taken on the plane indicated by section lines 4—4 of Figs. 2 and 5;

Fig. 5 is a fragmentary vertical section taken on section line 5—5 of Fig. 4;

Fig. 6 is a fragmentary plan view of an alternative and adjustable connection between the booster motor and the force distributing member;

Fig. 7 is a fragmentary side elevation of another embodiment of the invention;

Fig. 8 is a fragmentary plan view of the same;

Fig. 9 is a front elevation as seen from the left side of Fig. 7;

Fig. 10 is a fragmentary vertical section taken on line 10—10 of Fig. 7;

Figs. 11 and 12 are vertical sections taken on lines 11—11 and 12—12, respectively, of Fig. 13;

Figs. 13 and 14 are vertical sections on lines 13—13 and 14—14, respectively, of Fig. 11;

Fig. 15 is a horizontal section as taken on the planes indicated by section line 15—15 of Fig. 12;

Fig. 16 is a fragmentary vertical section taken on line 16—16 of Fig. 15; and

Fig. 17 is a fragmentary side elevation of another embodiment for use with mechanically operated brakes.

In Figs. 1 and 2 of the drawings, the reference numeral 1 identifies a centrally located longitudinal support of the vehicle frame to which a cross support 2 of channel shape is secured. A shaft 3 is journalled in a bearing block 4 mounted on channel 2 and a brake lever 5 and an arm 6 are rigidly secured to the opposite end of shaft 3, the arm 6 being connected by a spring 7 to a lug 8 on support 2 to urge the shaft 3 and brake lever 5 counterclockwise into a normal non-actuated position determined by the cooperating stop projections 9 on the hub of lever 5 and the bearing block 4 respectively. The usual brake pedal 10 is secured to the brake lever 5, and a spherical socket 11 is carried by lever 5 to receive the upper ball-shaped end of a rod 12 and support the same for rotation about its longitudinal axis and also for swinging movement in all directions. The rod 12 is threaded into a sleeve 13 which terminates at its lower end in a fork in which a force distributing member or cross bar 14 is mounted on a pin or shaft 15 for rocking movement about an axis transverse to the longitudinal axis of rod 12.

The opposite ends of the cross bar 14 rest upon the longer arcuate arms 16 and 17 of bell-crank levers which are pivoted on a shaft 18 mounted in bearings 19 secured to support 2, the axis of the shaft 18 being spaced rearwardly from the rod 12 and the lever arms 16, 17 extending to opposite sides of the rod 12. The upper cylindrical end of the sleeve 13 is journalled in a bushing 20 in a sleeve 21 which is connected by link 22 to the lower end of a lever 23 mounted on a shaft 24 supported on the bearing block 4. Lever 23 may be rocked by a foot pedal 25 which is pivotally connected to the upper end of lever 23 and is urged counterclockwise by a leaf spring 26. Foot pedal 25 is latched in a desired position of adjustment by a pawl 27 connected to an arm of the foot pedal and cooperating with a notched segment 28 secured to the bearing block 4. The latch may be released by rocking the foot pedal 25 clockwise, and the foot pedal may then be moved forward or back to turn the lever 23 to displace the force distributing arm 14 substantially parallel to itself, thereby to vary in the same sense the effective lengths or power arms of the levers 16, 17 of the mechanisms for imposing a braking force upon the respective sets of vehicle brakes. Maximum brake forces are obtained for any given displacement of the brake pedal 10 when the parts are adjusted as illustrated in Fig. 2 to provide a maximum spacing of the rod 12 from the axis of the levers 16, 17. The brake forces may be reduced to lower magnitudes for travel on smooth asphalt or wet roads by depressing the foot pedal 25 to release the pawl 27 from the notched segment 28, and then pushing the foot pedal 25 forwardly, thus rocking the lever 23 to move the rod 12 closer to the axis of the levers 16, 17. The rod 12 is maintained in its new adjustment by releasing the foot pedal 25 to permit engagement of pawl 27 with a notch of the segment 28.

The force distributing member 14 is turned with respect to the axis of the rod, by deceleration responsive means, to vary the ratio of the brake forces applied to the front wheel and rear wheel brakes. Mechanism for effecting this movement includes an arm 29 extending radially from the sleeve 13 and terminating in a ball end 30 seated in the cupped end of a rod 31, see Fig. 1; the other end of rod 31 being threaded into a socket 32 which affords a pivotal connection of the rod 31 to the ball end of a bell-crank lever 33 which is mounted on a bearing block 34 secured to the cross frame member 2. The other end of lever 33 is connected by a link 35 to the deceleration responsive mechanism which will be described later.

The turning of the force distributing member 14 with respect to the arcuate arms of bell-crank levers 16, 17 alters the ratio of the forces imposed upon the two sets of brakes since the remaining portions of the independent force transmitting systems are illustrated as of identical construction. The connections of the arm 17a of lever 17 to the hydraulic system of the brakes of the rear wheels are illustrated, in part in section, in Fig. 2, and some elements of the identical connections for the brakes of the front wheels are shown in dotted lines in Fig. 1 and identified by primed reference numerals. The forked end of a connecting rod 36 is pivoted to arm 17a of the lever 17, and the rearward ball end of the connecting rod is seated in the socket of a piston 37 in the hydraulic pressure cylinder 38 of the rear brake system. A spring 39 is seated between the rear end of the cylinder 38 and a packing washer 40 at an inner end of the piston 37; the spring urging the piston forwardly and thereby acting through connecting rod 36 to maintain the bell-crank lever 17 in engagement with the force distributing member 14. Dust is excluded from the forward end of the cylinder by flexible sleeves 41 of known conical type secured respectively to the connecting rod and to the cylinder. A tank 42 for the hydraulic brake fluid extends over the top of the pressure cylinders 38, 38', the tank being closed by a cover plate 43 provided with a filling opening closed by combined filling cap and vent 44. Cylinder 38 is connected to the tank 42 by a small opening 45 located approximately at the rear edge of the packing 40, and the rear end of the cylinder is connected through a coupling nipple 46 and flexible tubing 47 to the brake cylinders (not shown) of the brakes 48. The other pressure cylinder 38' is similarly connected by a nipple 46' and tubing 47' to the brakes 48' on the front wheels.

The deceleration responsive mechanism for automatically varying the ratio of the braking forces on the front and rear wheels includes a pendulum or inertia mass 49 pivoted on a bracket 50 to oscillate about an axis transverse to the vehicle, the bracket being secured to a cross member 51 of the vehicle frame. The inertia mass 49 is connected by a link 52 to an eye 53' on the end of the control rod 53 of the valve mechanism of a fluid pressure booster motor, see Figs. 2, 4 and 5, which comprises a housing 54 provided with a cylinder 55 which is closed tightly by a head 56. A piston 57 slides in this cylinder and has secured thereto a piston rod 58 which is connected to the link 35 of the linkage system for adjusting the force distributing member 14 angularly with respect to the arcuate arms of levers 16, 17 of the mechanisms for independently transmitting brake forces to the front wheel brakes 48' and the rear wheel brakes 48. The piston 57 is normally retained in forward position by a helical spring 59, this position corresponding to equality or to a low ratio of the braking forces applied to the rear wheels and front wheels of the vehicle. The piston rod 58 has rack teeth 60 meshing with a gear 61 which, in turn is in mesh with the rack teeth 62 of the outer cylindrical sleeve 63 of the valve mechanism for controlling the operation of the piston 57. Sleeve 63 is slidable in a cylindrical bore of the housing 54, and a second sleeve 64 is slidable within the sleeve 63, the inner sleeve 64 having a central bore in which the control rod 53 is supported for a limited range of sliding movement. The rod 53 has a radial flange 65 within the counterbored rear end of the sleeve 64, and the rod is limited in its range of free movement by a bushing 66 which is threaded into the rear end of sleeve 64. The valve sleeve 64 is yieldingly urged rearwardly in the outer valve sleeve 63 by a coiled spring 63a which is seated between the end of the sleeve 64 and skeleton frame 63b extending across the bore of the sleeve 63.

The outer valve sleeve 63 is provided with two annular grooves 67, 68 separated by a full-diameter portion 69 of the sleeve which has a close sliding fit within the valve cylinder, and a number of ports 70, 71 and 72 extend radially through the sleeve at the forward end of the rearward annular groove 67, at the rear end and at the front end of the annular groove 68, respectively. The intermediate portion of the inner valve sleeve 64 has a circumferential groove 73 for cooperation with radial ports 70, 71 of the outer sleeve 63, and has radial ports 74 opening into a chamber 75 at its forward end, the ports 74 alining with ports 72 of the outer sleeve 63 when the valve mechanism is in normal inoperative position, as shown in Fig. 4. Chamber 75 has an axial port 76 with a flaring inner end for cooperation with the conical tip of the control rod 53 to form a valve.

A port 77 opens through the housing 54 adjacent the forward end of the groove 72, in the normal position of the outer sleeve 63, and is connected by an exterior passage 78, see Figs. 1 and 2, to a port 79 extending through the wall of the power cylinder 55 near the rear thereof. The interior of the cylinder is thus in communication with the groove 72 and, in the normal non-actuated condition of the control mechanism, the groove 72 is open to atmosphere through ports 72 and 74, chamber 75, port 76, and a filter 80 which extends across the forward end of the cylinder in which the outer valve sleeve 63 is located. The rear end of the cylinder is provided with a flexible dust guard 81.

The described booster motor is designed for operation by a motive fluid under less than atmospheric pressure, but it is to be understood that a pressure fluid could be introduced in front of the piston 57. The motive fluid connection to the booster housing 54 is through a nipple 82 set in the wall of the valve cylinder in line with the forward end of the groove 67 of valve sleeve 63. A tube 83 extends from the nipple 82 to the inlet manifold 84 of the internal combustion engine 85 of the vehicle.

The method of operation of the brake system is as follows:

Assuming that the several parts are initially in the positions illustrated in Figs. 1 and 2, equal forces will be imposed upon the levers 16, 17 of the independent fluid pressure systems of the front wheel and rear wheel brakes. This equality of brake forces obtains since the force distributing bar 14 is parallel to the pivotal axis of the levers 16 and 17. The same fluid pressure is thus established in the pressure cylinders 38, 38' and transmitted to the rear wheel brakes 48 and front wheel brakes 48'. The pendulum inertia mass 49 swings in the direction of arrow Q as the vehicle is slowed down by the braking, and acts through link 52 to move the control rod 53 forwardly. The tip of the rod 53 closes the port 76 of chamber 75 upon a preselected angular displacement of the inertia mass 49, and the inner valve sleeve 64 is moved forwardly upon any further displacements of the inertia mass. The closing of the port 76 interrupts the communication between the motor cylinder 55 and atmosphere, since the cylinder is continuously open to groove 67 of the outer valve sleeve 63 but groove 67 opens to atmosphere only through ports 72, 74, chamber 75 and port 76. The booster motor is energized if the forward movement of the inner valve sleeve 64 is sufficient to bring the groove 73 into line with the radial ports 71 of the outer sleeve 63. When this occurs, the grooves 67 and 68 are connected through the groove 73 and the ports 71, 72, and the interior of the motor cylinder 55 is in communication with the engine manifold through the valve mechanism and tube 83. The reduction of air pressure in cylinder 55 moves the piston 57 rearwardly against the pressure of the spring 59, thereby moving the piston rod 58 to rock the bell-crank lever 33 clockwise. This results in a thrust upon connecting rod 31 which turns the sleeve 13 counterclockwise and moves the force distributing member 14 to lengthen the power arm of lever 16 of the brake system for the front wheels and to shorten the power arm of lever 17 of the brake system for the rear wheels. The ratio of the braking forces of the sets of brakes is thus altered by the turning of the force distributing member 14, and the particular ratio which is set up varies with the deceleration, i. e. with the angular displacement of the inertia mass.

This proportional control is obtained through the rack and pinion connection of the outer valve sleeve 63 to the piston rod 58. The valve sleeve 63 is moved forwardly when the reduced pressure within the cylinder 55 displaces the piston 57 and piston rod 58 rearwardly, and the motor stops when the forward movement of the valve sleeve 63 carries the ports 71 out of alinement with the groove 73 of the inner valve sleeve 64. The rate of deceleration may be such that the inertia mass 49 turns clockwise a further amount after the booster motor stops, thereby moving control rod 53 and inner valve sleeve 64 still further in a forward direction. The motor is thus energized since the groove 73 is again alined with ports 71 of valve sleeve 63, and the piston 57 moves rearwardly until the corresponding forward movement of the valve sleeve 63 moves the ports 71 out of communication with the groove 73 of valve sleeve 64.

The position of the force distributing member 14 with respect to the levers 16, 17 varies as a function of the deceleration, and the braking forces applied at the rear wheels are therefore varied in accordance with the momentary loading of the rear wheels as that loading alters with the slowing down of the vehicle. By appropriate design of the mechanical and hydraulic transmission systems the braking forces at the rear wheels may be kept below the values which would lock the rear wheels, and the braking forces at the front wheels may be correspondingly increased.

On a decrease or removal of the force applied to the brake pedal 10, the brake lever 5 is moved clockwise towards its original position by the spring 7 and also by the springs in the hydraulic cylinders 38, 38'. The braking action is decreased or removed entirely, and the inertia mass 49 turns counterclockwise towards its normal position, thus moving the control rod 53 rearwardly to open the port 76 of chamber 75 in the inner sleeve 64. This re-establishes communication between the motor cylinder 55 and atmosphere, and the spring 59 moves piston 57 forwardly. This piston movement is accompanied by an equal rearward displacement of the outer valve sleeve 63, in view of the rack and pinion coupling, and also by an equal rearward movement of the inner valve sleeve 64 by the relatively weak coiled spring 63a. Forward movement of the piston is arrested if the port 76 of chamber 75 is again closed by engagement with the tip of the control rod 53 before the vehicle comes to rest or is accelerated to restore the inertia mass 49 to, or beyond, its normal position corresponding to travel at constant speed. The position of the motor piston 57, and thereby the angular adjustment of the force distributing member 14, is thus directly and proportionally controlled by the deceleration-responsive inertia mass whether the rate of deceleration is increasing by a continued application of pressure on the brake pedal 10 or is decreasing by a removal of pressure from the brake pedal.

The friction between the rear wheels and the road also varies with the condition and nature of the road surface, the static load or weight on the rear wheels, and the slope of the road. The braking forces at both sets of brakes may be reduced by adjustment of the foot pedal 25 to shift the force distributing member 14 towards the pivotal axis of the levers 16, 17. This adjustment may be readily made by the operator when he encounters conditions of reduced traction, for example when the road surface is wet. The relative distribution of the static vehicle load between the front and rear wheels varies with the total load, and the initial ratio of the braking forces to be applied to the front wheels and rear wheels may be adjusted manually, and in accordance with the vehicle load, by turning the threaded rod 31 with respect to its socket end 32 to alter the effective length of the rod. Inspection of Fig. 2 will show that there is a relative movement of the vehicle frame and the inertia mass when the vehicle travels from a level road to an inclined road or hill, and that this relative movement is in the proper sense to compensate for change in wheel loading which is due to the slope of the road. The load on the rear wheels decreases when travelling down a slope, but the vehicle is tilted counterclockwise from the position shown in Fig. 2 when the vehicle is on a downhill slope, and this effects a relative displacement of the inertia mass in the direction of the arrow Q since the inertia mass hangs vertically below its pivot so long as the vehicle travels at a constant speed. This relative movement effects an initial operation of the booster motor, in the case of travel on mountain roads, which adjusts the force distributing arm 14 to increase the effective length of lever arm 16 and to decrease the effective length of the lever arm 17 prior to the application of the brakes. Except in the extreme case of a mountain road so steep as to effect the initial adjustment of member 14 to the end position, as shown in dotted line in Fig. 1, the slowing down of the vehicle upon an application of the brakes will displace the inertia mass 49 to effect a further reduction in the braking forces applied to the rear wheels.

Another and more convenient adjustment for altering the initial ratio of braking forces according to the vehicle loading is shown in Fig. 6. The unitary bell-crank lever 33 shown in Fig. 1 is here replaced by a two-part construction comprising a lever 86 journalled on a shaft 87 mounted in bearing block 34 and pivotally connected to the socket end 32 of rod 31, and a link or arcuate plate 88 also journalled on shaft 87 and pivotally connected by link 35 to the piston rod 58 of the booster motor. The plate 88 is provided with a plurality of openings 89 for receiving a coupling pin, not shown, carried by a spring-pressed handle 90 mounted on the arm 86' of the lever 86. The illustrated adjustment of the parts 86 and 88 is appropriate for a fully loaded vehicle, and the lever 86, 86' may be turned clockwise, by lifting the handle 90 to clear the pin from the end opening 89, and releasing the handle to engage the pin in another opening. This change in the linkage results in a counterclockwise adjustment of the force distributing member 14 to increase the initial braking force on the front brakes and to decrease the braking force on the rear brakes.

In the embodiment of the invention illustrated in Figs. 7 to 16 inclusive, a brake lever 91 is pivotally supported on a frame member 92 of the vehicle and connected by link 93 to an arm 94 fixed to the outer end of a shaft 95 which is journalled in the wall of a housing 96. A coiled spring 97 is connected between the lower end of the arm 94 and the housing 96 to restore the brake pedal to raised inoperative position upon a release of the brakes. A yoke or fork 98 is secured to the inner end of the shaft 95 and has pins extending into the circumferential groove of a hub 99 fixed to a rod 100 which is supported in bearings 101, 102 for both sliding and turning movements. A force distributing member 103 is mounted on a pin or shaft 104 which extends transversely of the rod 100, and the opposite ends of the member 103 carry rollers 105 for engagement with the arcuate arms of bell-crank levers 106, 107 through which forces are transmitted to the brakes of the front wheels and the rear wheels, respectively. The force distributing lever is of shallow U-form, see Fig. 10, to locate the contact line of the rollers 105 and levers 106, 107 in a plane through the axis of the rod 100.

Pressure on brake lever 91 will rock the yoke 98 clockwise, thereby displacing the rod 100 forwardly, or to the left as viewed in Fig. 11, to rock the levers 106, 107 counterclockwise, see Fig. 15, about the axis of a shaft 108 which supports the levers, see Fig. 10. The mechanism for turning rod 100 to vary the ratio of the braking forces at the front wheels and rear wheels includes a pinion 109 on rod 100 and locked against rotation with respect to rod 100 by a manually adjustable coupling. The pinion is journalled upon the rod 100 but held against axial movement, and the coupling includes a ratchet segment 110 fixed to the pinion 109 and a pawl 111 pivoted upon an arm 112 which extends from the hub 99 of rod 100. The pawl is normally held in engagement with the ratchet 110 by a coil spring 113, and it may be released by a pin 114 slidably mounted in a radial opening in hub 99 and rod 100 and having its inner end resting on a cam rod 115 journalled within the hollow forward end of the rod 100. A crank arm 116 is pinned to the outer end of the cam rod and connected by a link 117 to one arm of a lever 118 which is pivoted upon an arm 119 secured to the end of rod 100. The arm 119 extends vertically upward from the rod 100 and terminates in a handle 120 which extends horizontally and overlies the other arm of the lever 118. A leaf spring 121 is inserted between the lever 118 and the handle 120 to urge the lever 118 into that position at which the cam rod 115 does not force the pin 114 outwardly to release the pawl 111 from the ratchet segment 110.

The handle 120 and lever 118 are located below an opening 122 in the floor boards 123 of the vehicle adjacent the operator's seat (not shown), where they are conveniently available for manual adjustment of the initial angular arrangement of the rod 100 and the force distributing member 103 with respect to the levers 106 and 107 of the brake systems. This adjustment may be desirable when the vehicle is unloaded or when travelling on wet roads. The pawl 111 is released from the ratchet 110 by grasping both the handle 120 and the adjacent arm of lever 118, thereby rocking lever 118 to force the arm 116 of cam rod 115 downwardly and turn the cam rod to force the release pin 114 outwardly. The handle 120 can then be turned clockwise, see Fig. 9, to move the rod 100 and force distributing arm 103 clockwise, for example into the position indicated by line A—A of Fig. 10, to lengthen the power arm of lever 106 of the front wheel brakes and to shorten the power arm of lever 107 of the rear wheel brakes. The pinion 109 does not turn with the rod 100 during this adjustment since it is held stationary by the deceleration-responsive mechanism. Upon releasing the handle 120 in its new position, the spring 121 turns lever 118 to restore the cam rod 115 to normal position, and spring 113 draws the pawl 111 into engagement with the rack 100.

The shorter arms of the levers 106, 107 terminate in rounded ends 106', 107' which bear against pistons 124 slidable in pressure cylinders 125, 126 respectively. The cylinders and a tank 127 for fluid are formed as a housing which is bolted to the housing 96, and the tank portion is closed by a cover plate 128 having a vented filling opening covered by a cap 129. The walls of the cylinders having openings 130 for admitting fluid from the tank 127, the openings being cleared by the packing rings 131 of pistons 124 when the latter are moved to their inactive end positions by helical springs 132 within the cylinders. The closed end of cylinder 125 is connected by tubing 133 to the operating cylinders (not shown) of brakes 134 on the front wheels, and cylinder 126 is similarly connected by tubing 135 to the brakes 136 on the rear wheels.

The pinion 109 is in mesh with a rack 137 cut in a piston rod 138 which is slidable in bearing bosses 139 of the housing 96 and actuated by a piston 140 in a cylinder formed by the lower section of the housing 96. The lower end of the cylinder is closed by a head 141, and the piston is normally held at its upper range of movement by a spring 142 located between the piston and the cylinder head. The operation of the motor cylinder is controlled by a slide valve 143 suspended by a link 144 from one end of a pair of bars forming a lever 145 which is pivoted at about its center to a link 146 and has its other end pivotally connected to the piston rod 138. The upper end of link 146 is connected to an arm 147 secured to a shaft 148 which is journalled in a wall of the housing 96 and has a pendulum or inertia mass 149 fixed to its outer end. A stop pin 150 is preferably set in the wall of the housing 96 to prevent a rearward movement of the pendulum during acceleration or when travelling uphill.

The valve 143 slides vertically in the cylindrical passage 151 through a boss 152 integral with the housing 96. A central portion 153 of valve 143 is circumferentially grooved to connect horizontally alined passages in certain positions of the valve. As shown in Figs. 15 and 16, the passages include a horizontal passage 154 which opens into the air cylinder above the piston 140, a transverse horizontal passage 155 which extends from passage 154, and diametrically across the cylindrical valve passage 151 at the level of the groove 153 of valve 143 when the latter is in normal non-actuated position as shown in Fig. 12, to terminate at the upper end of a vertical passage 156. A horizontal passage 157 connects the lower end of passage 156 to the air cylinder below the piston 140. A third horizontal passage 158 extends diametrically across the valve passage 151 from the vertical passage 156 to a hollow nipple 159 threaded into the boss 152 to provide a connection for the tube 160 which extends to the manifold or suction space of an engine 161, see Figs. 8 and 16.

The method of operation is as follows:

Assuming that the rod 100 and pinion are so connected through pawl 111 and ratchet 110, that the force distributing member 103 is initially parallel to the axis 108 of the levers 106 and 107, see Fig. 10, equal braking forces will be set up at the front wheel brakes and the rear wheel brakes when the brake lever 91 is pushed down by the vehicle operator. The brake lever rocks the shaft 95 and yoke 98 clockwise, see Figs. 11 and 12, thus moving the rod 100 and the force distributing member 103 to the left, and the member 103 rocks levers 106, 107 to press the pistons 124 into pressure cylinders 125, 126 respectively. The pendulum 149 swings to the left as the vehicle slows down, thus turning shaft 148 and arm 147 clockwise, Fig. 12, and arm 147 presses link 146 downwardly to rock the lever 145 counterclockwise. The lever 145 moves the link 144 and slide valve 143 downwardly and, if the deceleration is sufficient, the groove 153 of valve 143 is horizontally alined with the passage 158, see Fig. 16. The space below the piston 140 is connected to the engine suction through passages 158, 156 and 157, and the reduced air pressure moves the piston 140 downwardly in opposition to the spring 142. The piston rod 138 turns the pinion 109 clockwise as it moves downwardly, thereby turning the rod 100 and force distributing member 103 clockwise to increase the effective power arm of lever 106 which actuates the hydraulic brakes of the front wheels and to decrease the effect of power arm of lever 107 which actuates the hydraulic brakes of the rear wheels. The downward movement of piston rod 138 rocks the lever 145 clockwise, thereby lifting the slide valve to close the passage 158 and arrest the downward movement of the piston 140. The displacement of the piston 140, and the resultant angular arrangement of the force distributing arm 103 with respect to levers 106, 107, is determined by and varies with the angular displacement of the pendulum or inertia mass 149. If the brakes are applied more strongly after the piston 140 comes to rest, the pendulum swings further to the left and forces the sliding valve 143 downward to open the air cylinder to the engine suction. The piston 140 is moved downwardly again and by that amount which rocks the lever 145 to lift the valve 143 to close the passage 158.

When the pressure on the brake pedal is removed and the vehicle accelerated, the pendulum 149 swings back towards the right and lifts the link 146 and, through the lever 145, the slide valve 143. The groove 153 of the valve alines with the passage 155 when returned to normal position, and the air spaces above and below the piston 140 are then in communication through the passages 154, 155, 156 and 157. The spring 142 returns the piston to its upper position, and piston rod 138 turns pinion 109 during this travel of piston 140 to return the rod 100 and force distributing member 103 to their initial positions. The return of the several parts of the apparatus will take place in several steps or stages when the pendulum 149 moves slowly back to its normal position after an initial and strong application of the brakes.

An adaptation of the apparatus of Figs. 7 to 16 for use with mechanical brakes is illustrated in Fig. 17. The apparatus within the housing 96 is the same as that previously described except that the force distributing lever 103 is at the left of the levers 106a, 107a, and the brake pedal 91a is keyed directly to the shaft 95. The lever 106a is rigidly fixed to the hub of a lever 162 which is at the outside of housing 96 and connected to the keys of the front wheel brakes by a rod 163. Similarly, the lever 107a is rigidly secured to the hub of a lever 164 which is connected through rod 165 to the keys of the rear wheel brakes. The distribution of the braking forces between the sets of wheels is controlled by the angular position of the pendulum 149 in exactly the same manner as described above with reference to Figs. 7 to 16.

It is to be understood that the invention is not limited to the particular constructions herein described and illustrated since various changes may be made in the parts and in their relative sizes, shapes and relationships without departure from the spirit and scope of the invention as set forth in the following claims.

I claim:
1. A brake system for vehicles comprising two sets of independently operable brakes, a brake lever, a rod, means connecting said rod to said brake lever for substantially longitudinal displacement thereby, means supporting said rod for angular movement about the longitudinal axis thereof, a force distributing member pivotally connected to said rod for rocking movement about an axis transverse to said longitudinal axis, a pair of levers pivoted for rocking about an axis at one side of said rod and extending from said rocking axis symmetrically to opposite sides of said rod for engagement by the opposite ends of said force distributing member, whereby turning of said rod about its longitudinal axis displaces the opposite ends of said force transmitting member in opposite sense with respect to the rocking axis of said levers, force transmitting means connected to the respective levers for individually actuating said sets of brakes, and deceleration-responsive means for turning said rod with respect to its longitudinal axis, thereby to vary the ratio of the forces imposed upon said force transmitting means by said brake lever and force distributing member.

2. A brake system as recited in claim 1, wherein said deceleration-responsive means includes an inertia mass movably supported on the vehicle for displacement as a function of the vehicle deceleration, motion transmitting means for adjusting said rod about its longitudinal axis to vary the ratio of said transmitted forces, a power source for actuating said motion transmitting means, and means controlled by displacement of said inertia mass to energize said power source to actuate said motion transmitting means in proportion to the inertia mass displacement.

3. A brake system as recited in claim 2, wherein said motion transmitting means comprises a linkage including levers adjustably connected to vary the initial angular adjustment of said rod at the normal non-displaced position of said inertia mass.

4. A brake system as recited in claim 1, wherein said means connecting said rod to said brake lever includes members manually adjustable to turn said rod to set said force distributing member in a preselected position with respect to the rocking axis of said levers in the normal non-displaced position of said deceleration-responsive means.

5. A brake system as recited in claim 1, in combination with manually adjustable means to displace said force distributing member substantially parallel to itself and toward or away from the rocking axis of said levers, thereby to alter the effective power arms of both levers of said pair in the same sense.

6. In a brake system for a wheeled vehicle, the combination of a brake lever, a rod pivotally supported by said lever for universal motion, a sleeve secured to said rod, means supporting said sleeve for turning about the axis of said rod, a force distributing member pivoted upon said sleeve for rocking movement about an axis transverse to the axis of the rod, a pair of bell-crank levers having arcuate arms positioned at opposite sides of the rod axis for engagement by the opposite ends of said force distributing member, front wheel and rear wheel brakes, independent transmission systems connecting one bell-crank lever to the front wheel brakes and the other bell-crank lever to the rear wheel brakes, an inertia mass supported for rocking movement about a horizontal axis transverse to the longitudinal axis of the vehicle, and power means energized by said inertia mass to turn said rod and force distributing member with respect to said bell-crank levers to vary the ratio of the braking forces transmitted to said front wheel brakes and rear wheel brakes in accordance with the relative loadings of the front wheels and the rear wheels.

7. In a brake system for a wheeled vehicle, the invention as recited in claim 6 wherein said power means comprises a fluid pressure motor of the cylinder and piston type, a source of motive fluid, valve means responsive to relative displacements of said inertia mass to connect said motor to said motive fluid source, and means responsive to displacement of the piston of said motor to actuate said valve means to break the connection of said motor to said motive fluid source upon completion of a piston displacement proportional to the inertia mass displacement.

8. In a brake system for a wheeled vehicle, the invention as recited in claim 7, wherein said valve means comprises an inner and an outer sliding valve sleeve, a control rod actuated by said inertia mass for moving the inner valve sleeve to connect the fluid pressure motor, and said outer valve sleeve is connected to said motor piston for actuation thereby to constitute said means for breaking the connection of said motor to said motive fluid source.

9. In a brake system for a wheeled vehicle, a brake lever, a rod, a pair of bearings supporting said rod for axial displacement and for turning, a force distributing member pivoted upon said rod for rocking movement about an axis transverse to the axis of said rod, a pair of bell-crank levers having arcuate arms positioned at opposite sides of the rod axis for engagement by the opposite ends of said force distributing member, front wheel and rear wheel brakes, independent transmission systems connecting one bell-crank lever to the front wheel brakes and the other bell-crank lever to the rear wheel brakes, an inertia mass supported for rocking movement about a horizontal axis transverse to the longitudinal axis of the vehicle, and power means energized by said inertia mass to turn said rod and force distributing member with respect to said bell-crank levers to vary the ratio of the braking forces transmitted to said front wheel brakes and rear wheel brakes in accordance with the relative loadings of the front wheels and the rear wheels.

10. In a brake system for a wheeled vehicle, the invention as recited in claim 9 wherein said power means comprises a fluid pressure motor of the cylinder and piston type, a source of motive fluid, valve means responsive to relative displacements of said inertia mass to connect said motor to said motive fluid source, and means responsive to displacement of the piston of said motor to actuate said valve means to break the connection of said motor to said motive fluid source upon completion of a piston displacement proportional to the inertia mass displacement.

11. In a brake system for a wheeled vehicle, the invention as recited in claim 10, wherein said valve means comprises a sliding valve connected by a link to one end of a lever, the other end of the lever being pivotally supported on the motor piston rod, a link pivotally connected to an intermediate point of said lever, and a crank arm actuated by said inertia mass pivotally connected to the other end of said link.

12. In a brake system for a wheeled vehicle, the invention as recited in claim 9, wherein said power means includes a pinion supported for rotation on said rod and in mesh with a rack on the piston rod of said power means, in combination with means for securing said pinion against rotation with respect to said rod.

13. In a brake system for a wheeled vehicle, the invention as recited in claim 12, wherein said securing means includes means adjustable to vary the relative angular relation of said pinion and said rod, thereby to adjust the initial angular position of said force distributing member with respect to said bell-crank levers.

BEDŘICH HELLER.

REFERENCES CITED

The following references are of record in the file of this patent:

UNITED STATES PATENTS

| Number | Name | Date |
|---|---|---|
| 1,795,145 | Rouanet | Mar. 3, 1931 |
| 1,874,822 | Smith | Aug. 30, 1932 |
| 2,073,163 | Martin | Mar. 9, 1937 |
| 2,074,718 | Bohannan | Mar. 23, 1937 |
| 2,115,071 | Hunt | Apr. 26, 1938 |
| 2,183,283 | Sampietro | Dec. 12, 1939 |